(12) United States Patent
Enck et al.

(10) Patent No.: US 6,609,083 B2
(45) Date of Patent: Aug. 19, 2003

(54) ADAPTIVE PERFORMANCE DATA MEASUREMENT AND COLLECTIONS

(75) Inventors: Brent A. Enck, Rio Oso, CA (US); Andrea Martin, Granite Bay, CA (US); David S. Flood, Auburn, CA (US); John Green, Rocklin, CA (US); James A. Knoop, West Seattle, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/870,673

(22) Filed: Jun. 1, 2001

(65) Prior Publication Data

US 2002/0183972 A1 Dec. 5, 2002

(51) Int. Cl.[7] ................................. G06F 3/00
(52) U.S. Cl. ................. 702/186; 702/179; 702/182; 702/188
(58) Field of Search ............... 702/179, 182, 702/186, 188, FOR 135, FOR 139, FOR 157, FOR 140, FOR 159; 710/100, 52, 58, 60

(56) References Cited

U.S. PATENT DOCUMENTS

| | | | | |
|---|---|---|---|---|
| 4,805,089 A | * | 2/1989 | Lane et al. | 364/188 |
| 5,062,055 A | * | 10/1991 | Chinnaswamy et al. | 364/513 |
| 5,375,070 A | * | 12/1994 | Hershey et al. | 364/550 |
| 6,148,307 A | * | 11/2000 | Burdick et al. | 707/104 |
| 6,292,589 B1 | * | 9/2001 | Chow et al. | 382/239 |
| 6,370,572 B1 | * | 4/2002 | Lindskog et al. | 709/223 |
| 6,378,013 B1 | * | 4/2002 | Hanson | 710/100 |

OTHER PUBLICATIONS

HP OpenView MeasureWare Agent for WindowsNT, User's Manual, Hewlett–Packard Company, Roseville, CA, 1999, pp. 1–302.
HP OpenView MeasureWave Agent, Dictionary of Operating System Performance Metrics, Hewlett–Packard Company, Roseville, CA 1997, pp. 1–423.

* cited by examiner

Primary Examiner—Marc S. Hoff
Assistant Examiner—Felix Suarez

(57) ABSTRACT

Methods and systems that adaptively measure and collect performance data are disclosed. An exemplary method includes acquiring system performance data in accordance with a performance policy. Then, data measurement and collection is dynamically adjusted based on the performance policy and a detected system condition. An alternative method includes establishing a self-monitoring data collection policy. At least one system performance metric is then measured in accordance with the self-monitoring data collection policy. The at least one system performance metric is evaluated to determine system health. The system performance metric measuring step is then dynamically adjusted based on the self-monitoring data collection policy and the system health. The steps of measuring, evaluating and dynamically adjusting are then repeated.

20 Claims, 6 Drawing Sheets

ADAPTIVE PERFORMANCE DATA MEASUREMENT AND COLLECTIONS

BACKGROUND OF THE INVENTION

1. Field of the Invention

The present invention relates to network management systems, and in particular to adaptive performance data measurement and collection systems.

2. Background Information

As technology continues to develop and be deployed to an increasing number of users and applications, networks become larger and more complex. Consequently, network management involves monitoring the deployed nodes (i.e, computers, servers, routers, sub-networks, network enabled devices, and the like). The monitoring process includes a variety of parameters that are important to the system manager and the health of the network.

One part of the monitoring performed by a client network management system is to measure and collect performance data of servers and other computer systems in the network. Performance measurement and collection agents are deployed to measure and collect all the data needed to diagnose a problem with the system. The performance measurement and collection agent uses a measurement engine that acquires desired system metrics (e.g., CPU utilization, percentage of memory used, and the like). This data can then be used for generating performance reports and for aiding system operators in diagnosing system problems such as a memory bottleneck. Those skilled in the art will appreciate that a significant amount of data is required to diagnose all potential system problems.

Prior performance measurement and collection agents (agents) have collected all the data needed to diagnose a problem all the time. This meant that the measurement and collection agent was using additional system resources and causing unneeded overhead to acquire data that was not needed to diagnose a problem. Examples of prior performance measurement and collection agents include commercially available software systems such as MeasureWare by Hewlett-Packard Company and Patrol by BMC Software, Inc. A description of the operation and configuration of MeasureWare can be found in "HP OpenView MeasureWare Agent for Windows NT: User's Manual", Hewlett-Packard Company, 1999, which is incorporated herein by reference in its entirety. These agents are preprogrammed with respect to the how and when the data is collected. Therefore, all data points are measured and collected at all times and cannot be dynamically turned on and off as the data is needed. Thus, the agent causes a continuous load on the system, even when the data is not required, using system resources that could be used for other processing.

Therefore, it would be desirable to provide a system that adaptively measures and collects performance data such that it allows for the minimal amount of overhead needed to diagnose a problem, which increases the amount of system resources available for system processing.

SUMMARY OF THE INVENTION

The present invention is directed to methods and systems for adaptively measuring and collecting performance data. An exemplary method comprises: acquiring system performance data in accordance with a performance policy; and dynamically adjusting data measurement and collection based on the performance policy and a detected system condition.

An alternative method of adaptively monitoring performance data in a computer-based system comprises: establishing a self-monitoring data collection policy; measuring at least one system performance metric in accordance with the self-monitoring data collection policy; evaluating the at least one system performance metric to determine system health; dynamically adjusting the system performance metric measuring step based on the self-monitoring data collection policy and the system health; and repeating the steps of measuring, evaluating and dynamically adjusting.

An exemplary adaptative measurement agent for measuring performance data in a computer-based system comprises: logic that acquires system performance data in accordance with a performance policy; and logic that dynamically adjusts data measurement and collection based on the performance policy and a detected system condition.

BRIEF DESCRIPTION OF THE DRAWINGS

The above features and advantages of the invention, and additional features and advantages of the invention, will be better appreciated from the following detailed description of the invention made with reference to the drawings, wherein like elements in the drawings will have the same reference number and wherein.

DETAILED DESCRIPTION OF THE PREFERRED EMBODIMENTS

Figure 1:
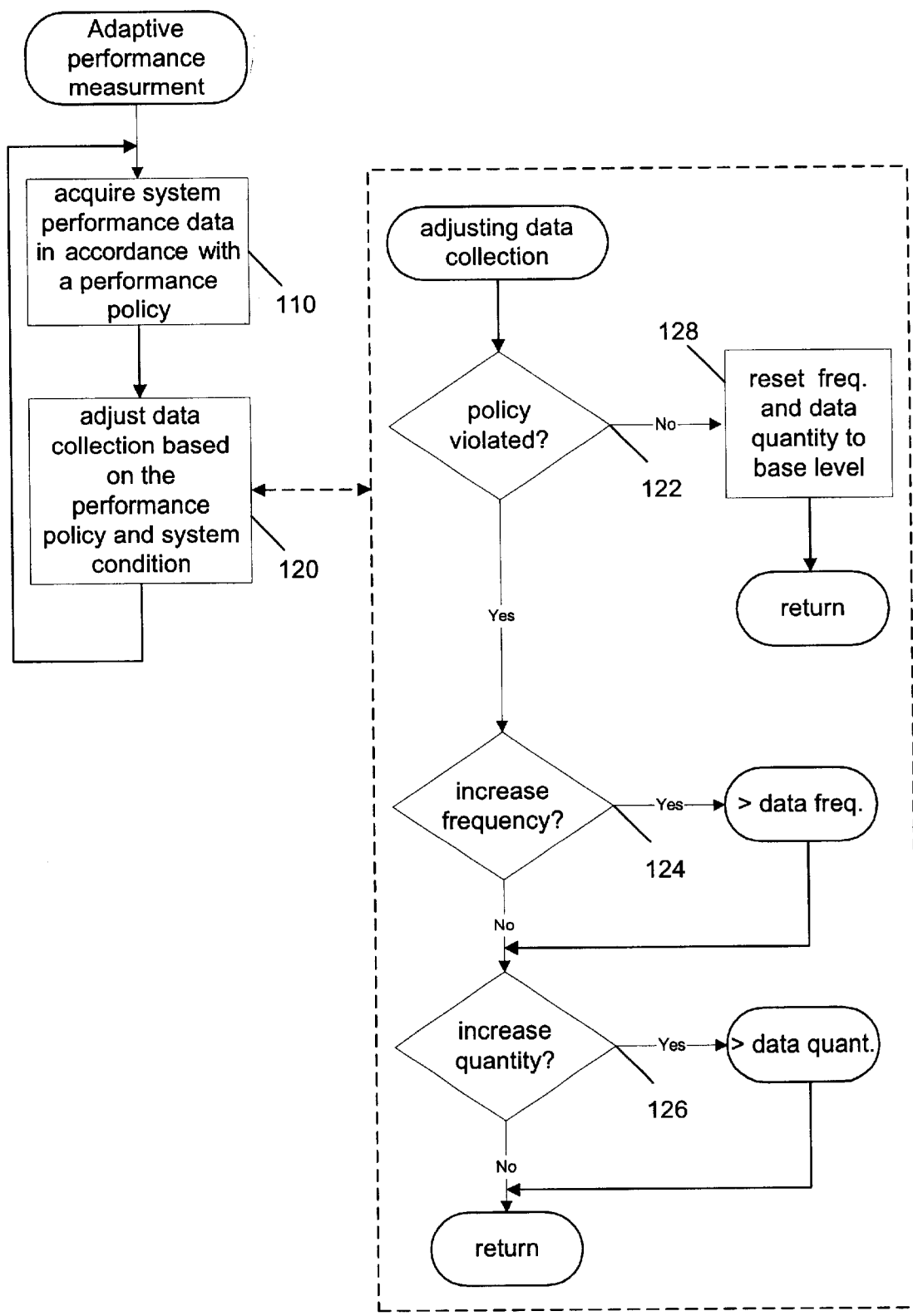
FIG. 1 shows a flowchart of an exemplary method of the present invention.

FIG. 1 is a flow chart of an exemplary method of adaptively measuring performance data in a computer-based system. The process starts in step 110 by acquiring system performance data in accordance with a performance policy. Then, in step 120, the data collection is dynamically adjusted based on the performance policy and a detected system condition. The process can loop as shown to continuously monitor the system performance data.

This adaptive performance data measurement and collection method provides the ability to tune the measurement and collection of performance data based on the detected system condition (i.e., the current state of the system being measured). For example, the measurement and collection begins by looking at a minimal set of performance data at a low measurement frequency (e.g., a base level of eight metrics acquired every five minutes). This allows the basic health of the system to be determined with minimal impact on system performance.

The performance policy defines the base level of data measurement and collection. The collection and observation of this base level of data continues until the process determines that the health of the system is no longer satisfactory (i.e., the performance policy has been violated) as shown in step 122. At this point, the data collection can be adjusted by adjusting the frequency of data collection and/or adjusting the data quantity collected at each data collection interval.

The performance policy and the system condition detected (e.g., CPU bottleneck) determine how the data measurement and collection is adjusted. For example, if the performance policy is violated by the detected system condition, the process can increase the frequency of data collection (i.e., check the values more frequently), in step 124, and/or the data quantity collected at each data collection interval (i.e., measure additional values relevant to the policy violation), in step 126. Those skilled in the art will appreciate that whether the frequency, quantity or both are increased will depend on the performance policy and the violation determined by the detected system condition.

The process returns to step 110 and the data is acquired in accordance with performance policy using the adjusted data collection parameters. Then, the process determines if the data collection needs further adjustment, based on the performance policy and the detected system condition (i.e., the health of the system is re-evaluated and the process decides if additional data/analysis is required), in step 120 again. This process is repeated until the cause of the problem is determined and presented to a user. When the detected system condition does not violate the performance policy (i.e., once the problem has been corrected and the process no longer detects any violation), it resets the frequency of data collection and/or the data quantity collected at each data collection interval to the base level, in step 128.

The performance policy discussed above can be directed to specific system conditions such as a CPU bottleneck, a memory bottleneck, a disk bottleneck, and the like. Those skilled in the art will appreciate that the system conditions are not limited to these three conditions, but can be directed to other system conditions.

Data collection occurs in intervals under normal or healthy operating conditions. Consistent, intervalized data (i.e., data collected at fixed or predetermined intervals) develops into historical data. The performance (e.g., CPU bottleneck) policies collect the historical data and analyze it to determine if a message should be sent to a system operator. If a potential system problem is detected, the collection intervals increase to determine if the situation warrants notifying the system operator.

The increased data measurement and collection provides data that can be examined in greater detail. If the data continues to violate the policies (e.g., thresholds) at this finer level of detail, then a message is sent to inform the system operator of the detected problem. The message can include the collected data and a description of those processes that are most responsible for the detected problem. The status of the affected nodes or services displayed in a graphical user interface can also be changed to indicate a performance problem using known techniques.

If the detected system conditions cease to violate the threshold for the time specified in the policy, then the messages about the violations can be automatically acknowledged and the status for the node and services displayed in the graphical user interface can be updated. The messages can be sent to an acknowledge database and the data collections can be stored on a local database of the node where the violation occurred. The status of the affected nodes or services displayed in the graphical user interface can then be changed to reflect to the status of the acknowledged message. Thus, the combination of the adaptive measurement process and the performance policies allows for this self-monitoring processes to be implemented.

Figure 2:
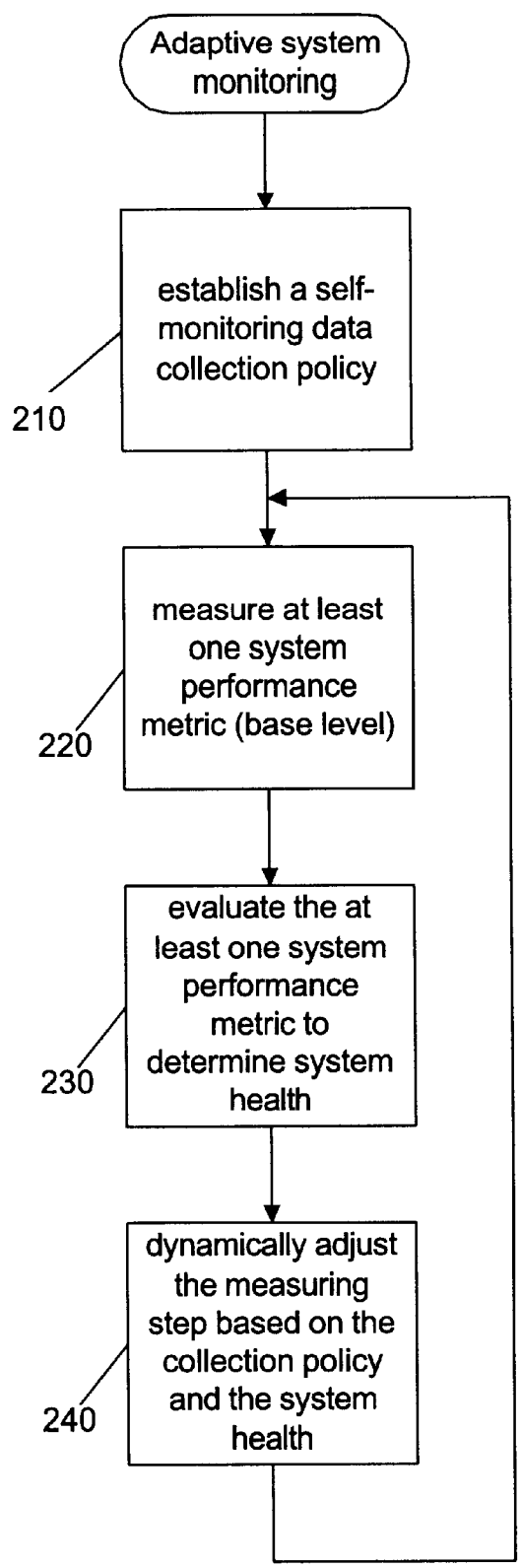
FIG. 2 shows a flowchart an alternative embodiment of an exemplary method of the present invention.

FIG. 2 is a flowchart of a method of adaptively monitoring performance data in a computer-based system. The process begins in step 210 by establishing a self-monitoring data collection policy. Those skilled in the art will appreciate that the self-monitoring data collection policy is one embodiment of the performance policy. In step 220, at least one system performance metric (e.g., a base level of system performance metrics) is measured in accordance with the self-monitoring data collection policy. The base level of metrics can be on the order of eight values, whereas the number of available system performance metrics can be on the order of three hundred. Therefore, significant system resources can be saved by monitoring only the base level of metrics until a system problem is detected. After the at least one system metric is obtained, it is evaluated to determine the system health, in step 230. For example, the system health can relate to the CPU condition, disk condition, memory condition, and the like. Those skilled in the art will appreciate that system health can be any one or more desired hardware and/or software operating conditions of the individual computer and/or network it resides upon. In step 240, the system performance metric measuring step is dynamically adjusted based on the self-monitoring data collection policy and the system health. The steps of measuring, evaluating and dynamically adjusting can be repeated to allow for continuous adaptive monitoring of the system performance metrics. Also, as noted above, the self-monitoring data collection policy can determine whether a system operator needs to be notified after the new data has been acquired and analyzed to determine if a policy violation is still present.

In general, as a problem is detected the frequency of measuring and quantity of metrics measured are increased in areas related to the problem detected. Conversely, once the problem has been resolved, the frequency of measuring and quantity of metrics measured can return to the base level.

Specific examples of performance policies are provided below for illustration and explanation of the invention. However, the invention is not limited to these performance policies. Those skilled in the art will appreciate that many other system conditions can be measured and collected.

A CPU bottleneck policy can be used to automate evaluation of potential bottleneck problems. This policy monitors CPU performance using the performance data acquired from the operating system. For example, if the processor time is greater than eighty five percent for a single five minute interval, processor instruction queue length (QueueLength) and process collections are started and the collection frequency is increased to one minute. If the QueueLength is greater than two for three out of five intervals, a message with the five processes consuming the most CPU processing power is sent to a system operator. However, if the QueueLength is less than two for three out of five intervals, no message is sent, and the processor instruction queue length and process collections are stopped and the monitoring of CPU performance is resumed at the base level frequency.

A disk bottleneck policy monitors physical disks for performance problems using performance data acquired from the operating system. For example, if the percentage of disk use time (% Disk Time) is greater than or equal to sixty six percent for a single five minute interval, a disk queue length (DiskQueueLength) collection is started and the collection frequency is increased to one minute. If the DiskQueueLength is greater than one for two out of three intervals, a message of critical severity is sent to a system operator. However, if the DiskQueueLength is less than two for three out of five intervals, no message is sent, the disk queue length collection is stopped and the monitoring of disk use time is resumed at the base level frequency.

A memory bottleneck policy sends a critical or minor message if a memory bottleneck is detected. For example, if committed memory in use is greater than or equal to eighty five percent for a single one minute interval, then a critical violation message is sent to an active messages browser to notify a system operator. However, if any of one of the following three statements are true, then a minor violation message is sent to the active messages browser to notify a system operator. First, if available memory is less than or equal to ten megabytes (MB), then a minor violation message is sent. Second, if the number of memory pages is greater than or equal to ten pages, and memory usage increases by 0.2 MB per an interval for three out of five intervals, and the increase over five intervals is greater than or equal to one MB and the increase over the last two intervals is greater than zero, then a minor violation message is sent. Third, if memory page faults are greater than or equal to ten pages and hard page faults is greater than or equal to fifteen percent for two out of three intervals, then a minor violation message is sent.

These bottleneck performance policies are provide for purposes of illustration and not as limitations of the scope of the invention. The above performance policies are common in that they adapt acquisition of system performance data when a threshold is violated (e.g., exceeded). They are also common in that once the performance policy has been violated and the acquisition of system performance data has been adapted in accordance with the performance policy, the new data is re-evaluated to determine if the system is still in violation of the performance policy. If the system is not still in violation of the performance policy, the acquisition of system performance data is reset to a base level.

The threshold used in the performance policy can be a percentage of total processor time, a percentage of committed memory in use, a percentage of disk use time, and the like. Those skilled in the art will recognize that many other system performance metrics/data can be acquired and used in accordance with the present invention. A sample of system performance metrics including descriptions can be found in "HP OpenView MeasureWare Agent: Dictionary of Operating System Performance Metrics", Hewlett-Packard Company, 1999, which is incorporated by reference herein in its entirety.

Additionally, those skilled in the art will appreciate that many of the thresholds set for detecting system conditions are system dependent and can be adjusted based on the specific configuration of the system. For example, a CPU bottleneck policy violation can have a threshold set to seventy five percent. Then, at seventy five percent the policy is violated and the data collection process is adjusted to allow more detailed data to be collected. As noted above, the performance policy is violated if a threshold is crossed.

In addition to adaptively measuring the performance data, the present invention can store the data in a persistent storage element (e.g., hard disk) and/or a transient storage element (e.g., dynamic random access memory, and the like). The stored data can be used for analysis of the system performance, trending, reports, and the like. Preferably, the data is stored in a manner (e.g., an ODBC compliant database) that facilitates access to the data by other programs. Persistent storage is advantageous in that it maintains data when the system is powered down, has larger capacity, and is less expensive per memory unit. Transient storage is advantageous in that it is typically faster than persistent memory, consumes less power and system resources and has no moving parts. A combination of both transient storage and persistent storage can also be used. For instance, system performance data could be logged to transient storage and periodically summarized and stored in a persistent storage during normal system operation. This would decrease the number of access times to a disk drive which is a resource intensive operation. Additionally, the amount of data logged on the disk would be reduced.

The system performance data can be acquired in a fixed time manner (e.g., every minute), a relative time manner (e.g., the first day of every month), and/or an event based manner (e.g., when a program is started). The system performance data can be collected in time series collections (e.g., historical data), a baseline collections and event based collections (e.g., log of usage of a particular program). Those skilled in the art will appreciate that data acquisition frequency and collection can be varied in many ways and that the invention is not limited to a particular data acquisition process or format.

To facilitate an understanding of the invention, many aspects of the invention are described in terms of sequences of actions to be performed by elements of a computer-based system. It will be recognized that in each of the embodiments, the various actions can be performed by specialized circuits (e.g., discrete logic gates interconnected to perform a specialized function), by program instructions being executed by one or more processors, or by a combination of both. Moreover, the invention can additionally be considered to be embodied entirely within any form of a computer readable storage medium having stored therein an appropriate set of computer instructions that would cause a processor to carry out the techniques described herein. Thus, the various aspects of the invention can be embodied in many different forms, and all such forms are contemplated to be within the scope of the invention. For each of the various aspects of the invention, any such form of an embodiment is referred to herein as "logic that" performs a described action.

Figure 3:
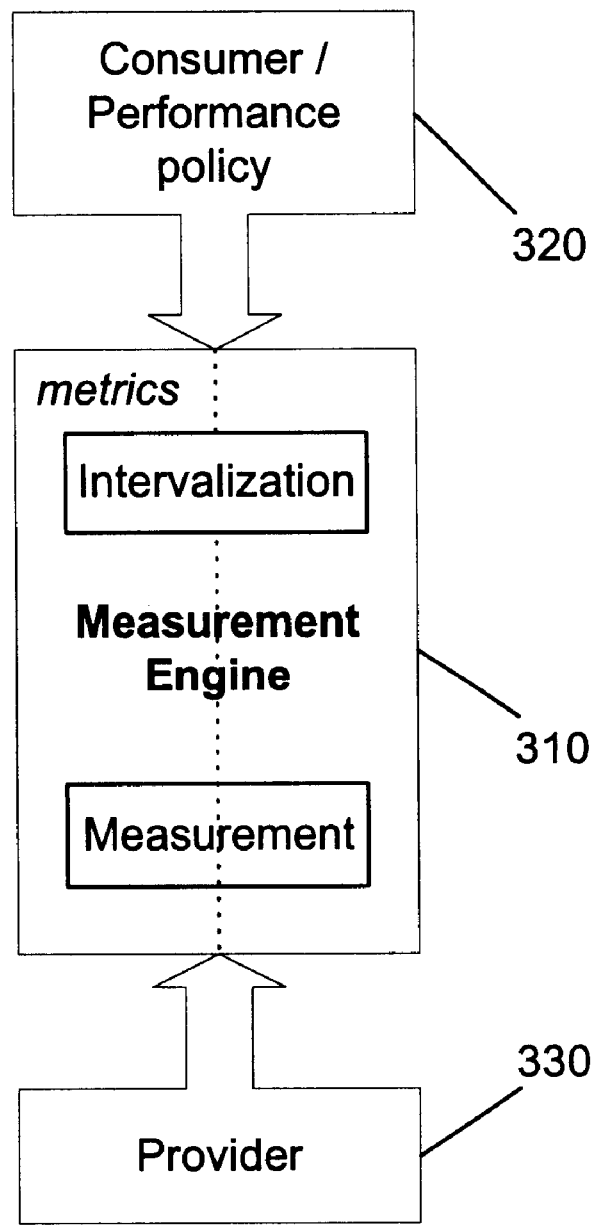
FIG. 3 illustrates an exemplary system of the present invention.

FIG. 3 illustrates an adaptative measurement agent for measuring performance data in a computer-based system. The system has logic that acquires system performance data 310 in accordance with a performance policy 320 and logic that dynamically adjusts data measurement and collection based on the performance policy and a detected system condition 320. The performance policy can contain both the logic that adjusts the data measurement and collection and logic that determines the detected system condition based on the performance data acquired. Those skilled in the art will appreciate that the detected system condition could also be supplied from another functional logic block or lookup table for certain system conditions.

Logic block 310 can be viewed as a measurement engine. The measurement engine 310 obtains information from data providers 330 (e.g., operating system, application programs, and the like) and provides the information to consumers 320 (e.g., the performance policies). The measurement engine performs data measurement (i.e., the acquisition of measurement data from various instrumentation sources), data collection (i.e., the collection and storage of measurement data), and data management (i.e., the manipulation of collected measurement data).

The data measurement features can include plugable instrumentation providers that have the ability create new data providers without making code modifications to the measurement engine and dynamic provider configuration which has the ability to recognize new providers and instrumentation on-the-fly.

The data collection features can include: collection storage (e.g., persistent and transient); collection types including time series collection, time relative collection and event based collection; dynamic configuration (i.e., the ability to add, delete and modify collections on-the-fly); and schema evolution (i.e., the ability to present a consistent view of data across schema changes).

The data management features can include: dynamic control (i.e., the ability to start and stop collections on-the-fly); capacity management (i.e., the ability to maintain a specified amount of data in a collection); filtering (i.e., the ability to access a subset of the collected data based on some criteria); and calculation (i.e., the ability to create metrics based on measurements and mathematical formulas).

Those skilled in the art will appreciate that the measurement engine performs functions common to all performance data measurement agents, such as data measurement, data collection and data management. ScopeNT is an example of a conventional measurement engine that is part of the MeasureWare Agent (see, "HP OpenView MeasureWare Agent for Windows NT: User's Manual", HewlettPackard Company, 1999, pages 13–39).

However, the dynamic control aspects of the above measurement engine are not present in prior measurement agents because, as previously noted, these were preprogrammed with respect to the how and when the data is collected. For example, exemplary embodiments of the present invention adaptively start and stop data measurement and collection as directed by the performance policy. Those skilled in the art will appreciate that the measurement agent can be integrated in a network management system, but is not limited to this configuration.

The adaptative measurement agent adjusts data measurement and collection by adjusting a frequency of data collection and/or adjusting data quantity collected at each data collection interval. Additionally, the adaptative measurement agent contains logic that resets the frequency of data collection, and the data quantity collected at each data collection interval to a base level when the detected system condition does not violate the performance policy. Alternatively, the adaptative measurement agent contains logic that increases the frequency of data collection and/or the data quantity collected at each data collection interval when the detected system condition violates the performance policy.

Figure 4:
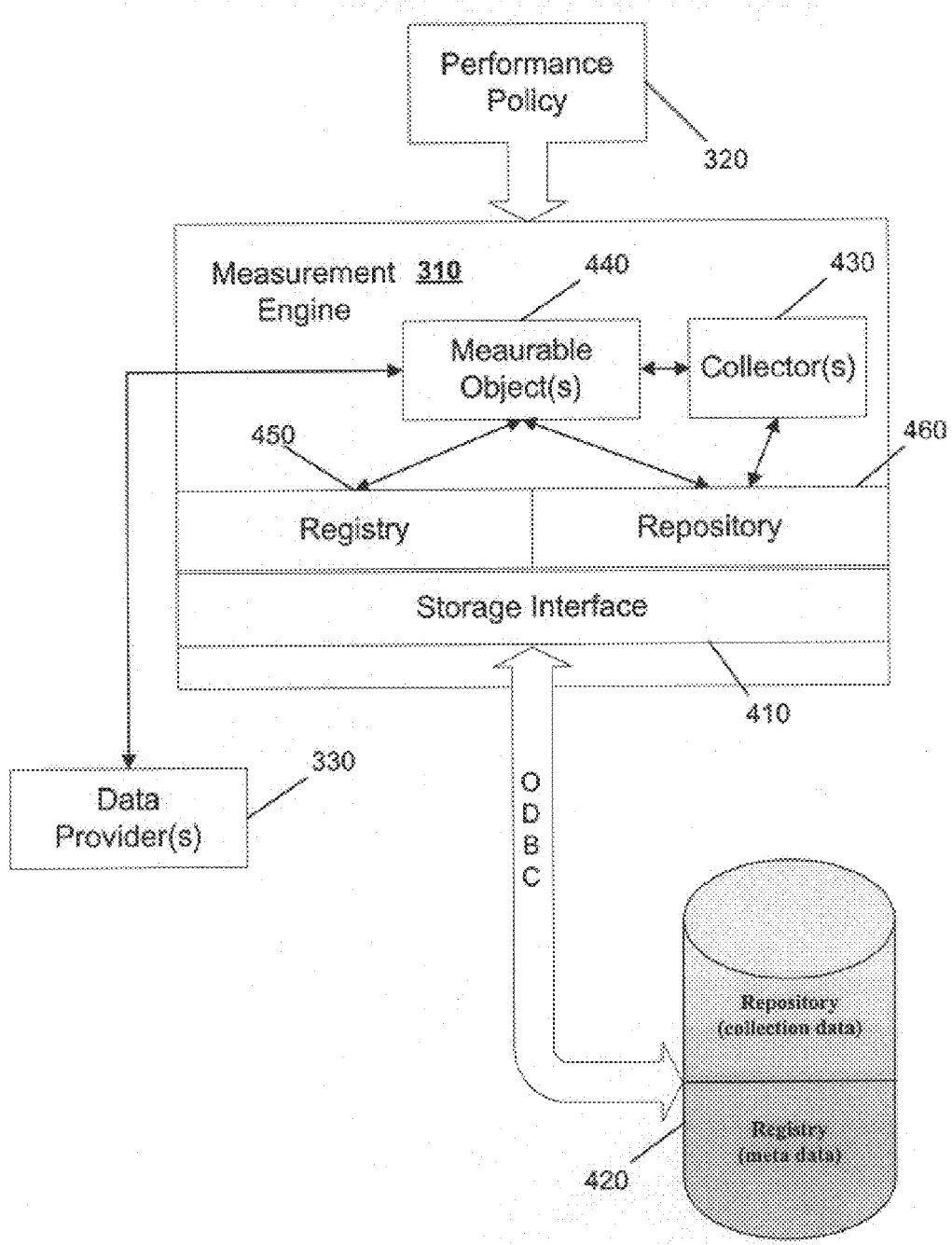
FIG. 4 illustrates a measurement agent of the present invention.

FIG. 4 shows a representation of the measurement agent and its interfaces. The measurement agent contains logic that stores data 410 in at least one of a persistent storage element 420 and/or a transient storage element. The data can be stored in a database that is compatible with ODBC protocol as shown or any other suitable format that allows data storage and retrieval. The data storage element 420 can store both repository and registry data. The repository 460 stores the collection data (e.g., time series collection, baseline collection, event based collection and the like). The registry 450 stores meta data (i.e., descriptions of the data that can be provided by the data providers). The repository 460 and registry 450 can be viewed as separate interfaces to the same underlying objects. That is, the registry 450 is a set of interfaces tailored to the data provider's needs and the repository 460 is a set of interfaces tailored to the performance policy's needs. Therefore, everything the data provider puts in the registry exists in the repository from the performance policy's perspective.

The collector 430 is instantiated to populate a collection (e.g., a history of metrics) with data. The collector is an internal object to the measurement engine 310 and the performance policy 320 does not interact directly with it. Collector 430 require a thread of control in order to wait on events such as a collection interval timer or configuration change. This thread of control can be separate from the main application thread of the performance policy. Regardless of which process it resides in, this thread of control can execute on the same node as the Measurable Object 440. In exemplary embodiments of the present invention, this approach avoids introducing sporadic network delays into the sampling. The sampling should be highly synchronized for time correlation purposes. Additionally, this approach avoids generating highly synchronized network traffic (i.e., generating a noticeable spike of network traffic at the end of each sample interval). The performance policy 320 reads collected data by creating views of the collections. These Collection Views are read-only handles into the underlying stores of collected data. Since each Collection View has its own buffer of collected object views, remote access to the Collection View can be provided in a buffered and unsynchronized fashion (i.e., avoiding predictable spikes in network traffic).

The Collection View provides access to the individual instances of collected objects that were present at the point in history that the sample was taken. These instances provide access to their individual attributes and metrics. The state of these instances are controlled by the Collection View. The state of the Collection View is controlled directly by the performance policy retrieving samples of data. That is, all instances change state in tandem as the performance policy manipulates the Collection View. Collection Views can reduce the data in several ways.

The most basic form of data reduction is to project a subset of attributes (i.e., counters, gauges, and the like) and metrics (e.g., rates and ratios of measured data). Expressions can also be used to derive new attributes or metrics from more detailed ones. For example, the collection can contain detailed metrics for components of CPU usage (e.g, real-time, interrupt, system, user, and the like). An expression can be used to consolidate these components into a single metric (e.g., total CPU usage). These expressions can be used for detecting a system problem (e.g., CPU_USAGE>85%). A subset of samples may be selected by using time-filtering (e.g., only samples between 8:00 am and 5:00 pm each day). A subset of instances may be selected using expression filtering (e.g., where CPU_USAGE>50%). Summarization can be used to provide the data at a longer sample interval than what it was collected at. The number of samples is reduced by aggregating several samples together. Aggregation can be used to consolidate instances together. Finally, data from several collections can be joined together into a single consolidated view. Since collecting the data has a cost, the performance policy can be set to collect the data it needs based upon the system condition it detects from an analysis of the data collected.

Figure 5:
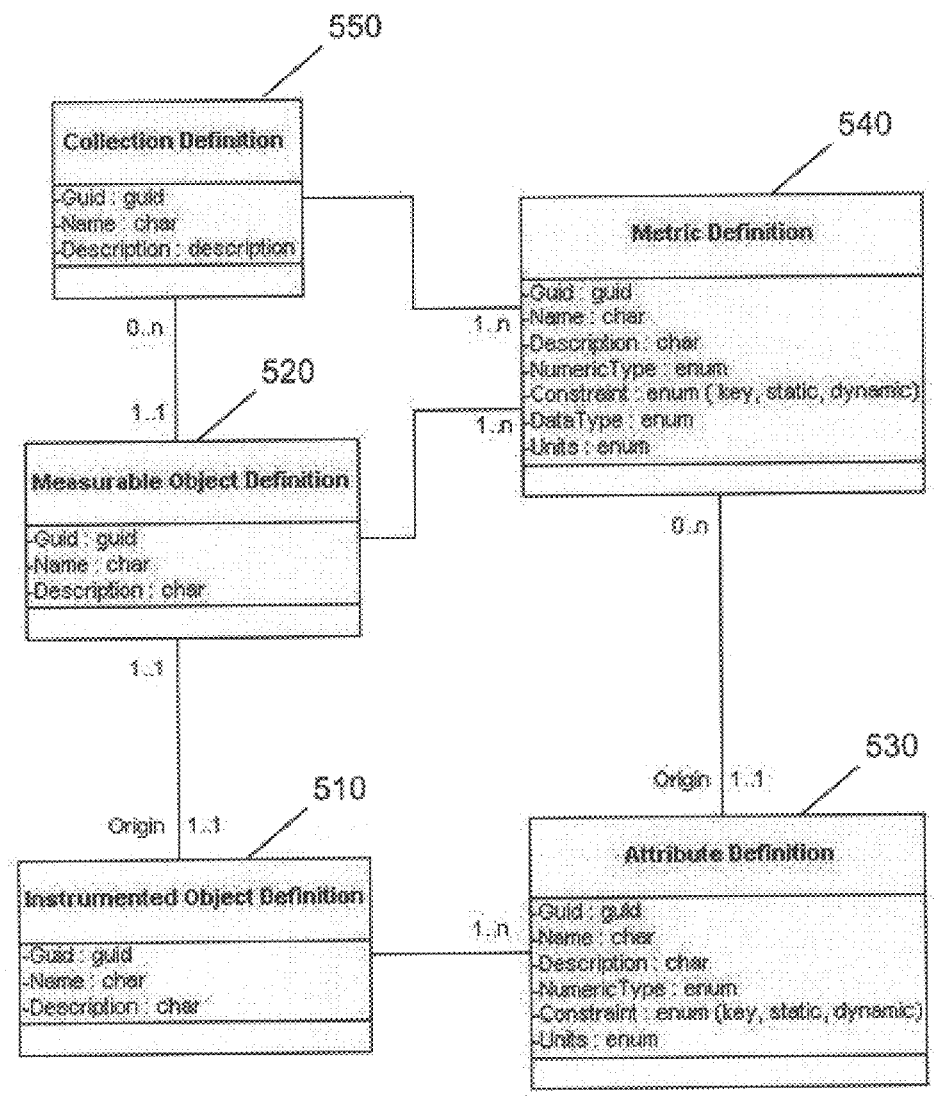
FIG. 5 illustrates a graphical relationship between the various data elements.

FIG. 5 shows a graphical relationship between the various data elements (i.e., a meta data schema) in the measurement agent. Instrumented Object 510 and/or Measurable Object 520 are defined by the provider using primitive elements, such as attributes, transactions, measurements, and metrics. The Instrumented Object 510 contains attributes 530, transactions, and measurements. The Measurable Object 520 contains, attributes 530 and metrics 540. The main difference between an Instrumented Object 510 and a Measurable Object 520 is how they are updated. The Instrumented Objects are updated on an event-driven basis (also referred to as asynchronous updates) while Measurable Objects are updated on a demand or time-driven basis (also referred to as synchronous or intervalized updates). Those skilled in the art will appreciate that the definitions contain the information necessary to initialize the various objects in the measurement agent. However, the invention is not limited to this example and other combinations and formatting of performance data can be used.

Regardless of how the data is provided, the performance policy uses the Measurable Objects 520 and Collections 550. Creating a Collection 550 is largely a matter of associating attributes and metrics from one or more Measurable Objects 520 as members of the Collection 550.

Figure 6:
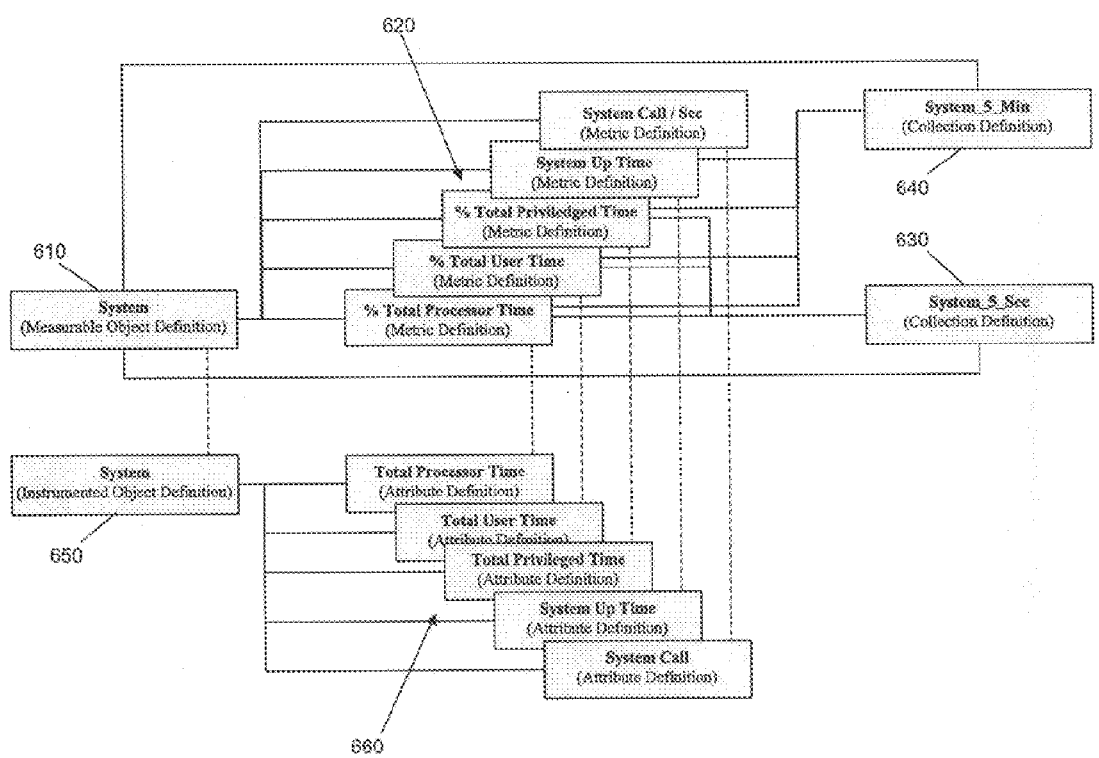
FIG. 6 illustrates the association of metric and attribute definitions.

FIG. 6 shows an example of associating attributes and metrics. The association of metric members 620 includes a collection intensity (e.g., 630 and 640) which is less than or equal to the maximum intensity available from the metric in the underlying Measurable Object Definition 610. In addition, some storage management information must be supplied. The Instrumented Object Definition 650 is associated with the attribute members 660. The measurement agent can use heuristics to expand the Instrumented Objects into all the statistical measurements that it can generate from the Instrumented Objects. For example, the System Call attribute can be a counter that registers the number of system calls. The System Call/Sec. metric is associated with the System Call attribute. The System Call/Sec. metric can be determined by dividing the total number of system calls in an interval by the interval, where the interval given in seconds.

The foregoing has described principles, preferred embodiments and modes of operation of the invention. However, the invention is not limited to the particular embodiments discussed above. For example, one of the above description focused mainly on the CPU metrics. However, those skilled in the art will appreciate the principles apply to all system performance data. Further, the framework describe above is for explanation and not limitation. For instance, the measurement engine provides a compartmentalized view of acquiring the operating system performance metrics. However, those skilled in the art will appreciate that any or all of the functions of the measurement engine could be performed separately or combined into one the performance policy so that the performance policy would make direct calls to the operating system for performance data, interface with data providers, storage elements, and the like. That is, the detailed steps of acquiring performance data in a computer-based system could be performed by the performance policy.

Therefore, the above-described embodiments should be regarded as illustrative rather than restrictive, and it should be appreciated that variations may be made in those embodiments by those skilled in the art, without departing from the scope of the invention as defined by the following claims.

What is claimed is:

1. A method of adaptively measuring performance data in a computer-based system comprising:
   acquiring system performance data in accordance with a performance policy; and
   dynamically adjusting data measurement and collection based on the performance policy and a detected system condition.

2. The method of claim 1, wherein adjusting data measurement and collection comprises at least one of adjusting a frequency of data collection and adjusting data quantity collected at each data collection interval.

3. The method of claim 2, further comprising:
   resetting at least one of the frequency of data collection, and the data quantity collected at each data collection interval to a base level when the detected system condition does not violate the performance policy.

4. The method of claim 2, further comprising:
   increasing at least one of the frequency of data collection and the data quantity collected at each data collection interval when the detected system condition violates the performance policy.

5. The method of claim 4, wherein the detected system condition is at least one of a CPU bottleneck, a memory bottleneck and a disk bottleneck.

6. The method of claim 5, wherein the performance policy is violated if a threshold is exceeded, wherein the threshold is at least one of a percentage of total processor time, a percentage of committed memory in use, and a percentage of disk use time.

7. The method of claim 1, further comprising:
   storing data in at least one of a persistent storage element and a transient storage element.

8. The method of claim 1, wherein acquiring system performance data is performed in at least one of a fixed time manner, a relative time manner and an event based manner.

9. The method of claim 1, further comprising:
   collecting data in at least one of a time series collection, a baseline collection and an event based collection.

10. A method of adaptively monitoring performance data in a computer-based system comprising:
    establishing a self-monitoring data collection policy;
    measuring at least one system performance metric in accordance with the self-monitoring data collection policy;
    evaluating the at least one system performance metric to determine system health;
    dynamically adjusting the system performance metric measuring step based on the self-monitoring data collection policy and the system health; and
    repeating the steps of measuring, evaluating and dynamically adjusting.

11. An adaptative measurement agent for measuring performance data in a computer-based system comprising:
    logic that acquires system performance data in accordance with a performance policy; and
    logic that dynamically adjusts data measurement and collection based on the performance policy and a detected system condition.

12. The adaptative measurement agent of claim 11, wherein adjusting data measurement and collection comprises at least one of adjusting a frequency of data collection and adjusting data quantity collected at each data collection interval.

13. The adaptative measurement agent of claim 12, further comprising:
    logic that resets at least one of the frequency of data collection, and the data quantity collected at each data collection interval to a base level when the detected system condition does not violate the performance policy.

14. The adaptative measurement agent of claim 12, further comprising:
    logic that increases at least one of the frequency of data collection and the data quantity collected at each data collection interval when the detected system condition violates the performance policy.

15. The adaptative measurement agent of claim 14, where in the detected system condition is at least one of a CPU bottleneck, a memory bottleneck and a disk bottleneck.

16. The adaptative measurement agent of claim 15, wherein the performance policy is violated if a threshold is exceeded, wherein the threshold is at least one of a percentage of total processor time, a percentage of committed memory in use, and a percentage of disk use time.

17. The adaptative measurement agent of claim 11, further comprising:

logic that stores data in at least one of a persistent storage element and a transient storage element.

18. The adaptative measurement agent of claim 11, wherein acquiring system performance data is performed in at least one of a fixed time manner, a relative time manner and an event based manner.

19. The adaptative measurement agent of claim 11, further comprising:

logic that collects data in at least one of a time series collection, a baseline collection and an event based collection.

20. The adaptative measurement agent of claim 11, wherein the measurement agent is integrated in a network management system.

* * * * *